(12) United States Patent
Hayashi et al.

(10) Patent No.: US 9,190,652 B2
(45) Date of Patent: *Nov. 17, 2015

(54) LAYERED SOLID-STATE BATTERY

(71) Applicant: MURATA MANUFACTURING CO., LTD., Nagaokakyo-Shi, Kyoto-Fu (JP)

(72) Inventors: Takeshi Hayashi, Nagaokakyo (JP); Masutaka Ouchi, Nagaokakyo (JP); Kunio Nishida, Nagaokakyo (JP); Makoto Yoshioka, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,451

(22) Filed: Feb. 8, 2013

(65) Prior Publication Data

US 2013/0149593 A1 Jun. 13, 2013

Related U.S. Application Data

(63) Continuation of application No. PCT/JP2011/067925, filed on Aug. 5, 2011.

(30) Foreign Application Priority Data

Aug. 9, 2010 (JP) .................................. 2010-178500

(51) Int. Cl.
*H01M 2/20* (2006.01)
*H01M 4/66* (2006.01)
*H01M 10/04* (2006.01)
*H01M 10/052* (2010.01)
*H01M 10/0585* (2010.01)

(52) U.S. Cl.
CPC ................ *H01M 2/204* (2013.01); *H01M 4/66* (2013.01); *H01M 10/044* (2013.01); *H01M 10/052* (2013.01); *H01M 10/0585* (2013.01); *Y02E 60/122* (2013.01)

(58) Field of Classification Search
None
See application file for complete search history.

(56) References Cited

U.S. PATENT DOCUMENTS

2001/0049050 A1* 12/2001 Aragane et al. ................. 429/62
2007/0196732 A1* 8/2007 Tatebayashi et al. ......... 429/181
2007/0202414 A1* 8/2007 Yoshida et al. ............... 429/304

(Continued)

FOREIGN PATENT DOCUMENTS

CN 101034743 A 9/2007
JP 2004-158222 A 6/2004

(Continued)

OTHER PUBLICATIONS

PCT/JP2011/067925 Written Opinion dated Apr. 11, 2011.

*Primary Examiner* — Patrick Ryan
*Assistant Examiner* — Haixia Zhang
(74) *Attorney, Agent, or Firm* — Arent Fox LLP

(57) ABSTRACT

A layered solid-state battery that includes a first unit cell, a second unit cell, and an internal collection layer that is disposed to intervene between the first unit cell and the second unit cell. Each of the unit cells is constituted of a positive electrode layer, a solid electrolyte layer, and a negative electrode layer that are sequentially stacked. The internal collection layer is disposed to be in contact with each of the negative electrode layers of the unit cells. Also, the internal collection layer contains an electron conductive material and an ion-conductively electrically conductive specific conductive material.

9 Claims, 6 Drawing Sheets

(56) References Cited

U.S. PATENT DOCUMENTS

2009/0197161 A1* 8/2009 Nakamura .................. 429/158
2010/0297537 A1* 11/2010 Coors et al. ................. 429/532

FOREIGN PATENT DOCUMENTS

| JP | 2008-198492 A | 8/2008 |
| JP | 2010-108751 A | 5/2010 |

* cited by examiner

LAYERED SOLID-STATE BATTERY

CROSS REFERENCE TO RELATED APPLICATIONS

The present application is a continuation of International application No. PCT/JP2011/067925, filed Aug. 5, 2011, which claims priority to Japanese Patent Application No. 2010-178500, filed Aug. 9, 2010, the entire contents of each of which are incorporated herein by reference.

FIELD OF THE INVENTION

The present invention generally relates to a layered solid-state battery, and specifically to a layered solid-state battery constructed so that unit cells are connected in parallel.

BACKGROUND OF THE INVENTION

In recent years, as a power supply of portable electronic equipment such as a portable phone or a portable personal computer, a battery, in particular a secondary battery, is used. As one example of a secondary battery, a lithium ion secondary battery is known to have a relatively large energy density. In such a secondary battery, a liquid electrolyte (electrolytic solution) of an organic solvent or the like is conventionally used as a medium for allowing ions to move. However, in a secondary battery using an electrolytic solution, there is a problem such as leakage of the electrolytic solution. Therefore, development of a layered solid-state battery in which all the constituent elements are constituted of solids using a solid electrolyte is being advanced.

As a structure of such a layered solid-state battery, Japanese Patent Application Laid-open (JP-A) No. 2004-158222 (hereafter referred to as Patent Document 1), for example, discloses a structure of a multi-layered battery in which battery cells, each of which is a thin-film solid-state lithium ion secondary battery, are stacked in plural stages.

In one structure disclosed in Patent Document 1, in a layered solid-state battery in which plural pieces of power-generating elements, each of which is constructed by stacking a positive electrode layer, a solid electrolyte layer, a negative electrode layer, and a collection layer, are stacked through the intermediary of an electron-conductively and ion-conductively insulating insulation layer, withdrawal tabs disposed on outer peripheral parts of the collection layers are disposed by being drawn out to the outside of the layered body perpendicularly to the layered body direction; via holes for connection penetrating through the insulation layer are provided in these withdrawal tabs; the via holes are made capable of embedding metal electrodes therein for connection; and connections of series type, parallel-type, and series-parallel-type can be selected by a combination of these connections.

Patent Document 1: Japanese Patent Application Laid-open (JP-A) No. 2004-158222

SUMMARY OF THE INVENTION

In one layered solid-state battery disclosed in Patent Document 1, the unit cells are electron-conductively and ion-conductively insulated from each other by the insulation layer, and the unit cells are electrically connected in parallel by the withdrawal tabs disposed on the outside of the unit cells.

However, since the unit cells are electrically connected on the outside of the unit cells using the withdrawal tab disposed for each unit cell, approximately the same number of withdrawal tabs as the unit cells are needed. Also, the volume for disposing the withdrawal tabs is needed to be provided in the layered solid-state battery.

Therefore, an object of the present invention is to provide a layered solid-state battery in which, with a simple construction, a plurality of unit cells constituting the layered solid-state battery can be connected in parallel.

A layered solid-state battery in accordance with the present invention includes first and second unit cells and an internal collection layer that is disposed so as to intervene between the first and second unit cells. Each of the first and second unit cells is constituted of a positive electrode layer, a solid electrolyte layer, and a negative electrode layer that are sequentially stacked. The internal collection layer is in contact with each of the positive electrode layers of the first and second unit cells or is in contact with each of the negative electrode layers of the first and second unit cells. Also, the internal collection layer contains an ion-conductively electrically conductive specific conductive material.

First, in the present invention, the same pole is disposed on both sides of the internal collection layer, so that a monopolar layered solid-state battery in which a plurality of unit cells are connected in parallel with an internal collection layer intervening therebetween can be obtained. By this, a layered solid-state battery of a high capacity can be obtained.

Also, in the layered solid-state battery of the present invention, the internal collection layer intervening between the first and second unit cells contains an ion-conductively electrically conductive specific conductive material, so that two unit cells adjacent to each other can be electrically connected in parallel, and the positive electrode layers or the negative electrode layers can be ion-conductively conducted with each other in adjacent two unit cells. By this, the electric potential between the positive electrode layers or the negative electrode layers that are adjacent to each other with the internal collection layer intervening therebetween can be leveled, so that a stable output voltage can be obtained.

Further, external collection members such as withdrawal tabs can be omitted, and the unit cells constituting the layered solid-state battery can be electrically connected in parallel. By this, a layered solid-state battery excellent in space utilization ratio and cost performance can be obtained.

In the layered solid-state battery of the present invention, the internal collection layer further contains an electron conductive material.

By adopting such a construction, the electron conductivity of the internal collection layer can be enhanced.

The electron conductive material preferably contains at least one selected from the group consisting of an electrically conductive oxide, a metal, and a carbon material.

In the layered solid-state battery of the present invention, the specific conductive material preferably has a structure identical to or similar to that of a solid electrolyte material contained in at least one layer selected from the positive electrode layer and the negative electrode layer.

By adopting such a construction, the shrinkage ratios of the positive electrode layer or the negative electrode layer, the solid electrolyte layer, and the internal collection layer can be made closer to each other. By this, generation of cracks or the like can be restrained in fabricating the layered solid-state battery by integral sintering.

Also, in the layered solid-state battery of the present invention, the solid electrolyte material and the specific conductive material preferably contain a compound containing lithium.

Further, in the layered solid-state battery of the present invention, the solid electrolyte material and the specific conductive material preferably contain a lithium-containing phosphoric acid compound.

By adopting such a construction, the layered solid-state battery can be fabricated densely by integral sintering.

In the layered solid-state battery of the present invention, the solid electrolyte material and the specific conductive material preferably contain a lithium-containing phosphoric acid compound having a NASICON structure.

The lithium-containing phosphoric acid compound having a NASICON structure contained in the specific conductive material is preferably represented by the chemical formula $Li_{1+x}M_xM'_{2-x}(PO_4)_3$ (in the chemical formula, x satisfies $0 \leq x \leq 1$; M is Al or Ga; and M' is one or more elements selected from the group consisting of Ti, Ge, and Zr). In this case, part of P may be replaced with B, Si, or the like in the chemical formula.

In the layered solid-state battery of the present invention, an active substance material contained in at least one layer selected from the positive electrode layer and the negative electrode layer, a solid electrolyte material contained in at least one layer selected from the positive electrode layer and the negative electrode layer, a solid electrolyte material contained in the solid electrolyte layer, and the specific conductive material contained in the internal collection layer preferably contain a lithium-containing phosphoric acid compound.

By adopting such a construction, the positive electrode layer or the negative electrode layer, the solid electrolyte layer, and the internal collection layer have a phosphoric acid skeleton in common, whereby a layered solid-state battery having a low resistance can be fabricated more densely by integral sintering.

Also, the layered solid-state battery of the present invention is a layered solid-state battery formed by stacking n pieces of unit cells each of which is constituted of a positive electrode layer, a solid electrolyte layer, and a negative electrode layer that are sequentially stacked, while disposing n−1 pieces of the internal collection layers between the n pieces of the unit cells, wherein external electrodes having electron conductivity are preferably disposed on a surface of the unit cells located on the first stage and on the n-th stage that is not adjacent to the internal collection layers. Further, the internal collection layers that are in contact with the positive electrode layers of the unit cells among n−1 pieces of the internal collection layers and the external electrodes that are in contact with the positive electrode layers of the unit cells are preferably connected to a positive electrode terminal, and the internal collection layers that are in contact with the negative electrode layers of the unit cells among n−1 pieces of the internal collection layers and the external electrodes that are in contact with the negative electrode layers of the unit cells are preferably connected to a negative electrode terminal.

The end surfaces of the unit cells located on the uppermost stage and on the lowermost stage of the layered solid-state battery need not be ion-conductively insulated, so that an ion-conductively insulating layer need not be necessarily disposed. Therefore, by disposing external electrodes having electron conductivity in the above-described manner, the electric resistance of the layered solid-state battery can be reduced.

In the layered solid-state battery of the present invention, an electrically conductive material that forms the external electrode preferably contains at least one selected from an electrically conductive oxide and a metal.

As described above, according to the present invention, the same pole is disposed on both sides of the internal collection layer, so that a monopolar layered solid-state battery in which a plurality of unit cells are connected in parallel with an internal collection layer intervening therebetween can be obtained. Also, with a simple construction, the plurality of unit cells constituting the layered solid-state battery can be connected in parallel, and the positive electrode layers or the negative electrode layers can be ion-conductively conducted with each other in adjacent two unit cells, so that the electric potential between the positive electrode layers or the negative electrode layers that are adjacent to each other with the internal collection layer intervening therebetween can be leveled, and a stable output voltage can be obtained.

DETAILED DESCRIPTION OF PREFERRED EMBODIMENTS OF THE INVENTION

Hereafter, embodiments of the present invention will be described with reference to the drawings.

First Embodiment

First, a layered body that forms a basic structure of a layered solid-state battery will be described as a first embodiment of the present invention. Here, in each of the later-described embodiments of the present invention, the planar shape of the layered body is not limited; however, description will be given assuming that the shape is generally a rectangular shape.

Figure 1:
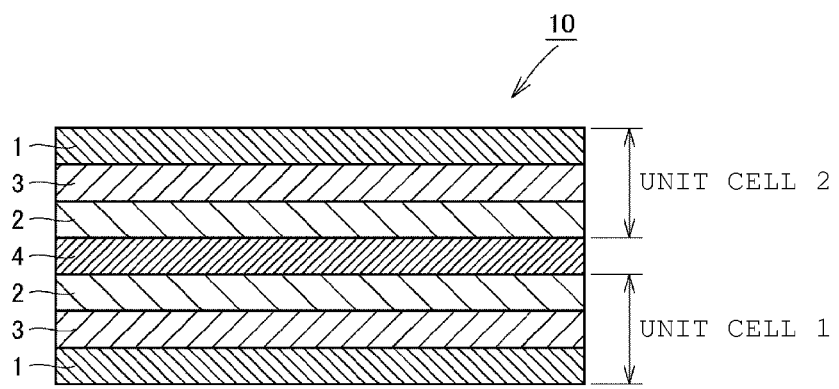
FIG. 1 is a cross-sectional view schematically illustrating a cross-sectional structure of a layered solid-state battery as a first embodiment of the present invention.

As illustrated in FIG. 1, in a layered solid-state battery 10, a (unit cell 1) and a (unit cell 2) are stacked with an internal collection layer 4 intervening therebetween. Each of the (unit cell 1) and the (unit cell 2) is constituted of a positive electrode layer 1, a solid electrolyte layer 3, and a negative electrode layer 2 that are sequentially stacked.

The (unit cell 1), the (unit cell 2), and the internal collection layer 4 are stacked so that the negative electrode layer 2 of the (unit cell 2) is adjacent to one side surface (the upper surface in FIG. 1) of the internal collection layer 4, and the negative electrode layer 2 of the (unit cell 1) is adjacent to the other side surface (the lower surface in FIG. 1) of the internal collection layer 4. In FIG. 1, the internal collection layer 4 is disposed so as to be in contact with the negative electrode layer 2 of each of the (unit cell 1) and the (unit cell 2); however, the internal collection layer 4 may be disposed so as to be in contact with the positive electrode layer 1 of each of the (unit cell 1) and the (unit cell 2). The internal collection layer 4 contains at least an ion-conductively electrically conductive specific conductive material.

In the layered solid-state battery 10 of the present invention constructed in the above-described manner, the same pole is disposed on both sides of the internal collection layer 4, so that a monopolar layered solid-state battery 10 in which a plurality of unit cells are connected in parallel with an internal collection layer 4 intervening therebetween can be obtained. By this, a layered solid-state battery 10 of a high capacity can be obtained.

Also, in the layered solid-state battery 10 of the present invention, the internal collection layer 4 intervening between the (unit cell 1) and the (unit cell 2) contains an ion-conductively electrically conductive specific conductive material, so that two unit cells adjacent to each other can be electrically connected in parallel, and the positive electrode layers 1 or the negative electrode layers 2 can be ion-conductively conducted with each other in adjacent two unit cells. By this, the electric potential between the positive electrode layers 1 or the negative electrode layers 2 that are adjacent to each other with the internal collection layer 4 intervening therebetween can be leveled, so that a stable output voltage can be obtained.

Further, external collection members such as withdrawal tabs can be omitted, and the unit cells constituting the layered solid-state battery 10 can be electrically connected in parallel. By this, a layered solid-state battery 10 excellent in space utilization ratio and cost performance can be obtained.

In the layered solid-state battery 10 constructed in the above-described manner, the internal collection layer 4 further contains an electron conductive material. Specifically, the internal collection layer 4 preferably contains at least one electron conductive material selected from the group consisting of an electrically conductive oxide, a metal, and a carbon material, and an ion-conductively electrically conductive specific conductive material. Here, nickel, copper, silver, and the like having a low electric resistance are particularly preferable for a metal used as the electron conductive material.

By adopting such a construction, the electron conductivity of the internal collection layer 4 can be enhanced.

As described above, by using an ion-conductively electrically conductive material as the specific conductive material contained in the internal collection layer 4, the positive electrode layers 1 or the negative electrode layers 2 stacked with the internal collection layer 4 intervening therebetween can be ion-conductively conducted with each other, and also by allowing an electron-conductive material to be contained in the internal collection layer 4, the positive electrode layers 1 or the negative electrode layers 2 stacked with the internal collection layer 4 intervening therebetween can be brought into electrical contact with each other. By this, the electric potential between the positive electrode layers 1 or the negative electrode layers 2 that are adjacent to each other with the internal collection layer 4 intervening therebetween can be leveled, so that a stable output voltage can be obtained.

Also, the specific conductive material preferably has a structure identical to or similar to that of a solid electrolyte material contained in at least one layer selected from the positive electrode layer 1 and the negative electrode layer 2.

By adopting such a construction, the shrinkage ratios of the positive electrode layer 1 or the negative electrode layer 2, the solid electrolyte layer 3, and the internal collection layer 4 can be made closer to each other. By this, generation of cracks or the like can be restrained in fabricating the layered solid-state battery 10 by integral sintering.

Further, the solid electrolyte material and the specific conductive material preferably contain a compound containing lithium. Furthermore, the solid electrolyte material and the specific conductive material preferably contain a lithium-containing phosphoric acid compound. In these cases, the solid electrolyte material and the specific conductive material need not be compounds having the same composition or the same composition ratio.

By adopting such a construction, the layered solid-state battery 10 can be fabricated densely by integral sintering. In particular, a dense layered body with improved close adhesion property of the positive electrode layer 1, the negative electrode layer 2, the solid electrolyte layer 3, and the internal collection layer 4 can be obtained without generation of exfoliation or cracks.

In the layered solid-state battery 10 of the present invention, the solid electrolyte material and the specific conductive material preferably contain a lithium-containing phosphoric acid compound having a NASICON structure. In this case, the solid electrolyte material and the specific conductive material need not be compounds having the same composition or the same composition ratio, and it is sufficient that these are compounds having similar structures.

The lithium-containing phosphoric acid compound having a NASICON structure contained in the specific conductive material is preferably represented by the chemical formula $Li_xM_y(PO_4)_3$ (in the chemical formula, x satisfies $1 \leq x \leq 2$; y satisfies $1 \leq y \leq 2$; and M is one or more elements selected from the group consisting of Ti, Ge, Al, Ga, and Zr). In this case, part of P may be replaced with B, Si, or the like in the chemical formula.

As the lithium-containing phosphoric acid compound having a NASICON structure used in the solid electrolyte material and the specific conductive material, a mixture obtained by mixing two or more lithium-containing phosphoric acid compounds having a NASICON structure, each having a different composition from each other, such as $Li_{1.5}Al_{0.5}Ge_{1.5}(PO_4)_3$ and $Li_{1.2}Al_{0.2}Ti_{1.8}(PO_4)_3$ may be used, for example.

Also, as the lithium-containing phosphoric acid compound having a NASICON structure used in the solid electrolyte material and the specific conductive material, a compound containing a crystal phase of a lithium-containing phosphoric acid compound having a NASICON structure or glass that deposits a crystal phase of a lithium-containing phosphoric acid compound having a NASICON structure by heat treatment may be used.

Here, as a material used in the solid electrolyte material, a material having ion conductivity and having electron conductivity so small as to be ignorable can be used instead of the lithium-containing phosphoric acid compound having a NASICON structure. Examples of such a material can include lithium halide, lithium nitride, lithium oxygen acid salt, and derivatives thereof. Also, examples of such a material can include Li—P—O-based compounds such as lithium phosphate ($Li_3PO_4$), LIPON ($LiPO_{4-x}N_x$) obtained by mixing nitrogen with lithium phosphate, Li—Si—O-based compounds such as $Li_4SiO_4$, Li—P—Si—O-based compounds, Li—V—Si—O-based compounds, compounds having a Perovskite structure such as $La_{0.51}Li_{0.35}TiO_{2.94}$, $La_{0.55}Li_{0.35}TiO_3$, and $Li_{3x}La_{2/3-x}TiO_3$, and compounds having a garnet structure having Li, La, and Zr.

In the layered solid-state battery 10 of the present invention, an active substance material contained in at least one layer of the positive electrode layer 1 and the negative electrode layer 2, a solid electrolyte material contained in at least one layer of the positive electrode layer 1 and the negative electrode layer 2, a solid electrolyte material contained in the solid electrolyte layer 3, and the specific conductive material contained in the internal collection layer 4 preferably contain a lithium-containing phosphoric acid compound.

By adopting such a construction, the positive electrode layer 1 or the negative electrode layer 2, the solid electrolyte layer 3, and the internal collection layer 4 have a phosphoric acid skeleton in common, whereby a layered solid-state battery 10 having a low resistance can be fabricated more densely by integral sintering.

Here, the type of the active substance material is not particularly limited; however, as a positive electrode active substance material, a lithium-containing phosphoric acid compound having a NASICON structure such as $Li_3V_2(PO_4)_3$, $LiFePO_4$, or $LiMnPO_4$, or a lithium-containing phosphoric acid compound having an olivine structure can be used. Also, a layered compound such as $LiCoO_2$ or $LiCo_{1/3}Ni_{1/3}Mn_{1/3}O_2$, a lithium-containing compound having a spinel structure such as $LiMn_2O_4$, $LiNi_{0.5}Mn_{1.5}O_4$, or $Li_4Ti_5O_{12}$, or a phosphoric acid compound such as $LiFePO_4$ or $LiMnPO_4$ can be used as the positive electrode active substance material. As a negative electrode active substance material, a graphite-lithium compound, a lithium alloy such as Li—Al, oxide such as $Li_3V_2(PO_4)_3$, $Li_3Fe_2(PO_4)_3$, or $Li_4Ti_5O_{12}$, or the like can be used.

The method for forming the internal collection layer 4 is not particularly limited; however, it may be carried out by preparing materials in a slurry form and stacking green sheets, by preparing materials in a paste form and performing screen printing, or the like. The method for molding the green sheets is not particularly limited; however, it may be carried out by using a die-coater, a comma-coater, the screen printing method, or the like. The method for stacking the green sheets is not particularly limited; however, it may be carried out by hot isostatic pressing (HIP), cold isostatic pressing (CIP), water isostatic pressing (WIP), or the like.

Second Embodiment

Figure 2:
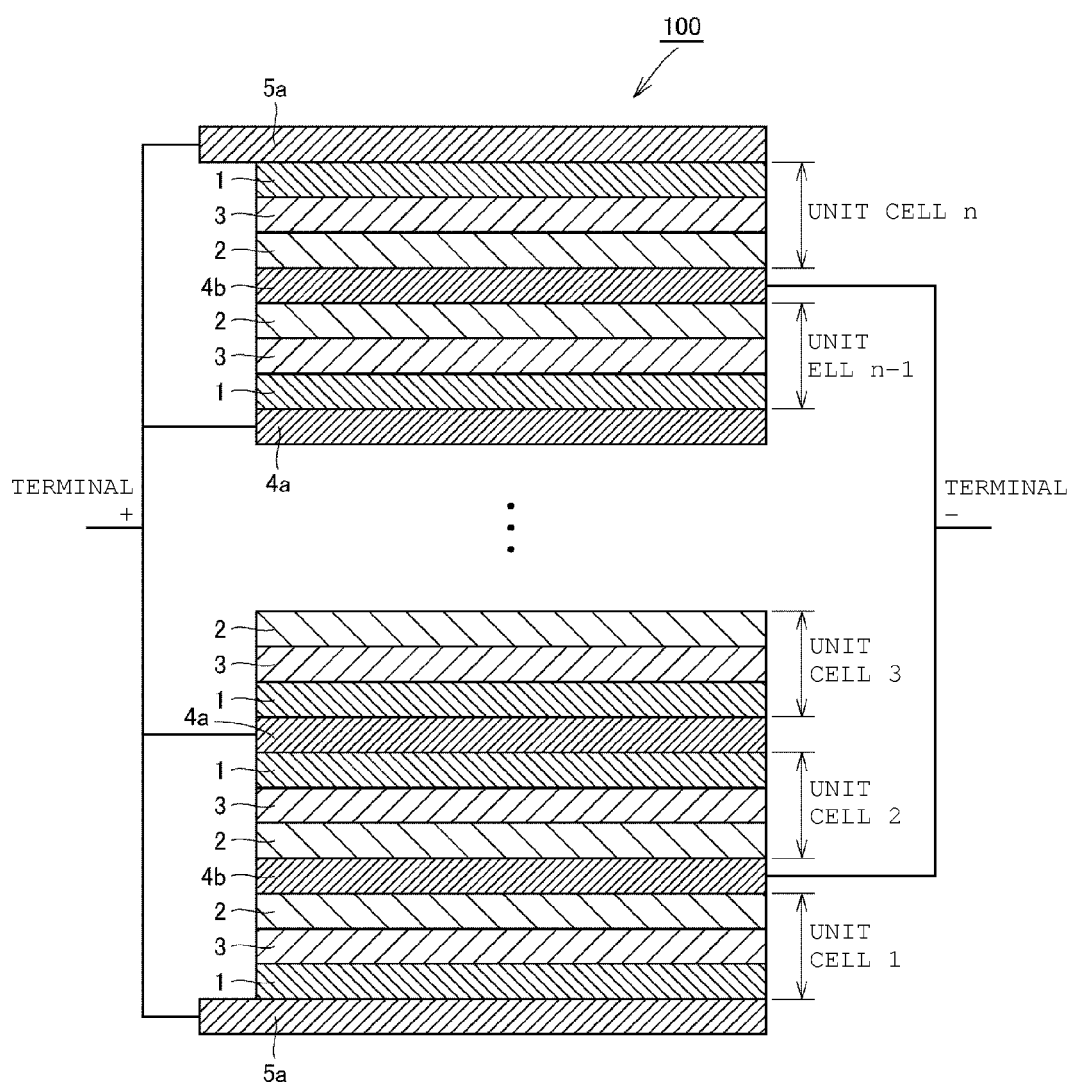
FIG. 2 is a cross-sectional view schematically illustrating a cross-sectional structure of a layered solid-state battery in the case where an even number of unit cells are provided as a second embodiment of the present invention.
Figure 3:
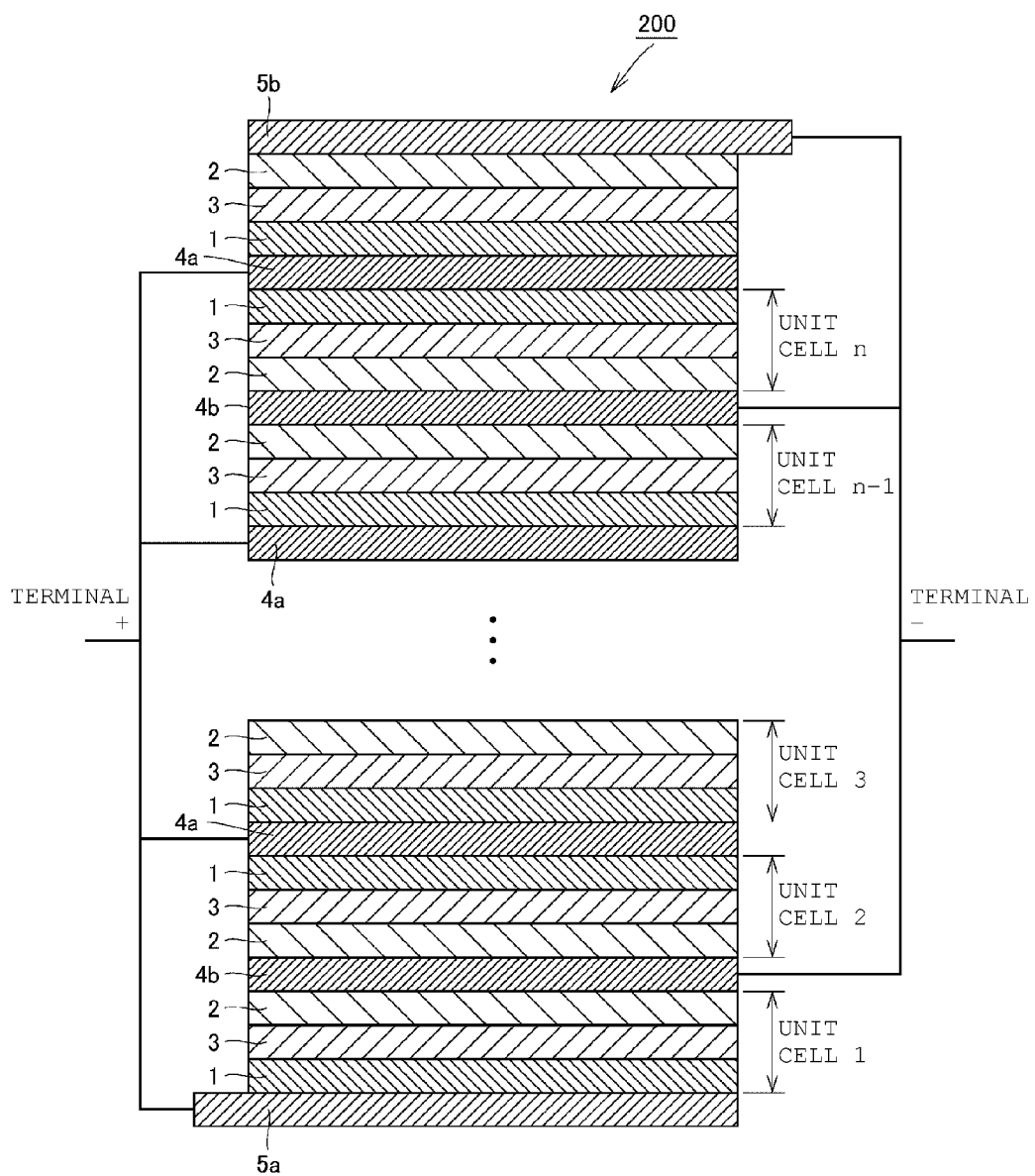
FIG. 3 is a cross-sectional view schematically illustrating a cross-sectional structure of a layered solid-state battery in the case where an odd number of unit cells are provided as a second embodiment of the present invention.

Next, as a second embodiment of the present invention, a layered solid-state battery having a layered solid-state battery 10 illustrated in FIG. 1 as a basic structure will be described. FIG. 2 is a cross-sectional view schematically illustrating a cross-sectional structure of a layered solid-state battery in the case where an even number of unit cells are provided, and FIG. 3 is a cross-sectional view schematically illustrating a cross-sectional structure of a layered solid-state battery in the case where an odd number of unit cells are provided.

As illustrated in FIG. 2, in the same manner as in FIG. 1, in a layered solid-state battery 100, n pieces (an even number) of (unit cells 1 to n) are stacked with internal collection layers 4a, 4b intervening therebetween. As illustrated in FIG. 3, in the same manner as in FIG. 1, in a layered solid-state battery 200, n+1 pieces (an odd number) of unit cells are stacked with internal collection layers 4a, 4b intervening therebetween. In order that the positive electrode layers 1 (negative electrode layers 2) of the (unit cells 1 to n) are disposed to face each other in the stack direction, n pieces or n+1 pieces of unit cells are stacked with n−1 pieces or n pieces of the internal collection layers 4a, 4b intervening therebetween. The positive electrode layers 1 are disposed to face each other with the internal collection layers 4a intervening therebetween. The negative electrode layers 2 are disposed to face each other with the internal collection layers 4b intervening therebetween. As illustrated in FIG. 2, an external electrode 5a is disposed on the outside surfaces of the layered body formed by stacking n pieces of unit cells. As illustrated in FIG. 3, external electrodes 5a and 5b are disposed on the outside surfaces of the layered body formed by stacking n+1 pieces of unit cells. Specifically, as illustrated in FIGS. 2 and 3, in the (unit cell 1) located on the lowermost stage which is one end of the layered body, an external electrode 5a having electron conductivity is disposed on the surface of the positive electrode layer 1 that is not adjacent to the solid electrolyte layer 3. As illustrated in FIG. 2, in the (unit cell n) located on the uppermost stage which is the other end of the layered body, an external electrode 5a having electron conductivity is disposed on the surface of the positive electrode layer 1 that is not adjacent to the solid electrolyte layer 3. As illustrated in FIG. 3, in the unit cell located on the uppermost stage which is the other end of the layered body and disposed on the (unit cell n), an external electrode 5b having electron conductivity is disposed on the surface of the negative electrode layer 2 that is not adjacent to the solid electrolyte layer 3. In FIG. 2, charging and discharging are carried out by connecting the external electrodes 5a and the respective internal collection layers 4a to a positive electrode terminal and connecting the respective internal collection layers 4b to a negative electrode terminal. In FIG. 3, charging and discharging are carried out by connecting the external electrode 5a and the respective internal collection layers 4a to a positive electrode terminal and connecting the external electrode 5a and the respective internal collection layers 4b to a negative electrode terminal.

In the layered solid-state battery 100 or 200 constructed as described above, by using an ion-conductively electrically conductive material as the specific conductive material contained in the internal collection layers 4a, 4b, the positive electrode layers 1 or the negative electrode layers 2 stacked with the internal collection layers 4a, 4b intervening therebetween can be ion-conductively conducted with each other, and also by allowing an electron-conductive material to be contained in the internal collection layers 4a, 4b, the positive electrode layers 1 or the negative electrode layers 2 stacked with the internal collection layers 4a or 4b intervening therebetween can be brought into electrical contact with each other. By this, the electric potential between the positive electrode layers 1 or the negative electrode layers 2 that are adjacent to each other with the internal collection layers 4a or 4b intervening therebetween can be leveled, so that a stable output voltage can be obtained. Also, n pieces or n+1 pieces of unit cells constituting the layered solid-state battery 100 or 200 can be electrically connected in parallel without using external collection members such as withdrawal tabs. By this, a layered solid-state battery 100 excellent in space utilization ratio and cost performance can be obtained.

Here, the method of constructing the layered solid-state battery 100 or 200 of the present embodiment is not particularly limited, for example, a method of first constructing n pieces or n+1 pieces of unit cells and internal collection layers 4a or 4b and sequentially stacking them so as to sandwich them with a pair of external electrodes 5a and 5b to form the layered solid-state battery 100 or 200, a method of sequentially stacking the positive electrode layer 1, the solid electrolyte layer 3, the negative electrode layer 2, and the internal collection layer 4b on the external electrode 5a and finally stacking the external electrode 5b to form the layered solid-state battery 100 or 200, or the like may be adopted.

Figure 6:
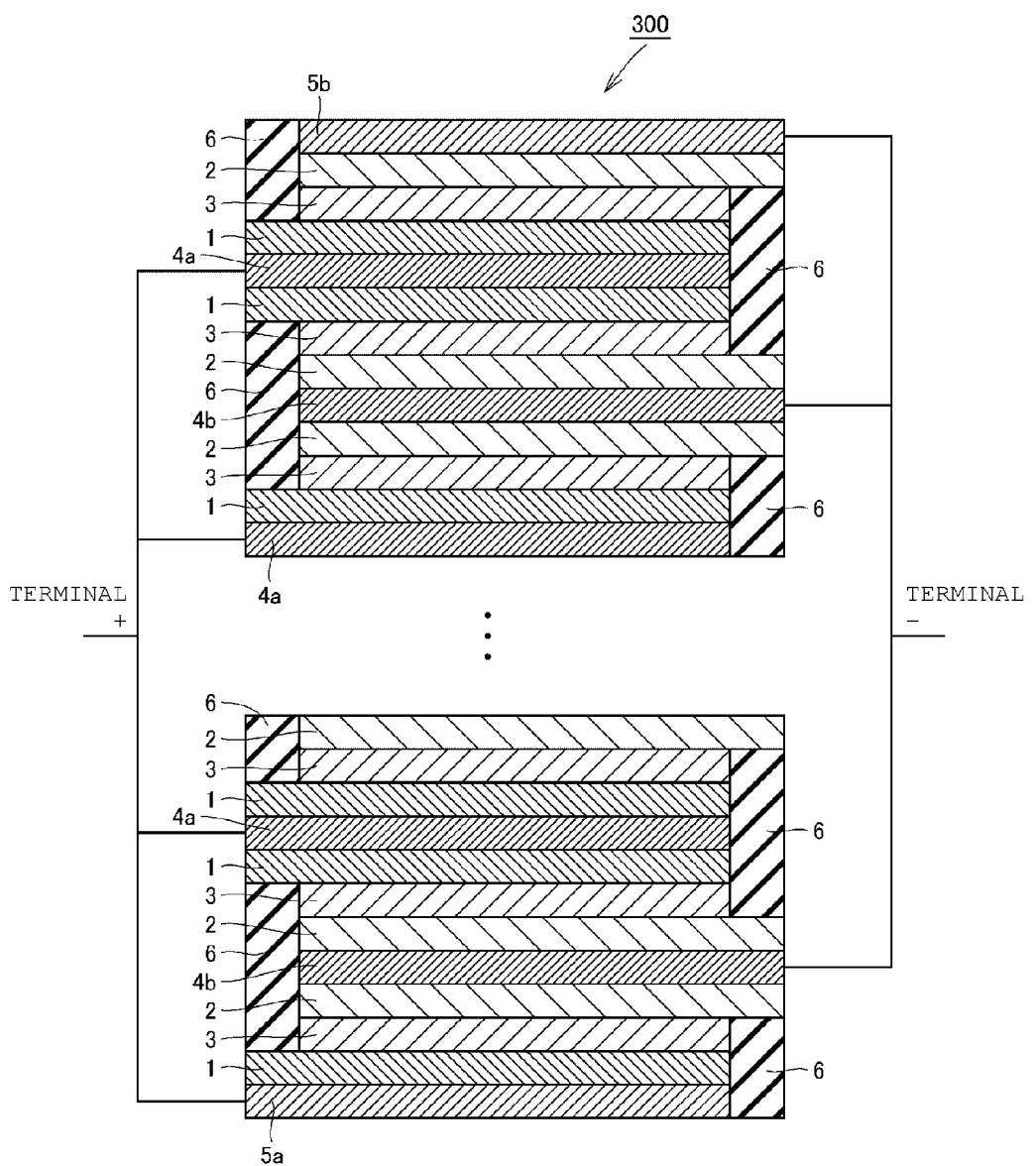
FIG. 6 is a cross-sectional view schematically illustrating a cross-sectional structure of a layered solid-state battery in the case where an odd number of unit cells are provided as a third embodiment of the present invention.

Also, as in a layered solid-state battery 300 illustrated in FIG. 6, by disposing a protective layer 6 on the side surface of a positive electrode layer 1 and a negative electrode layer 2, a structure may be formed in which short circuit by contact of the positive electrode layer 1 and the negative electrode layer 2 on the side surface of the layered solid-state battery 300 hardly takes place. In this case, it is sufficient that the protective layer 6 is constituted of a material that does not have electron conductivity. As a material thereof, for example, a lithium-containing phosphoric acid compound having a NASICON structure such as $Li_{1.5}Al_{0.5}Ge_{1.5}(PO_4)_3$ or $Li_{1.2}Al_{0.2}Ti_{1.8}(PO_4)_3$ may be used.

Figure 7:
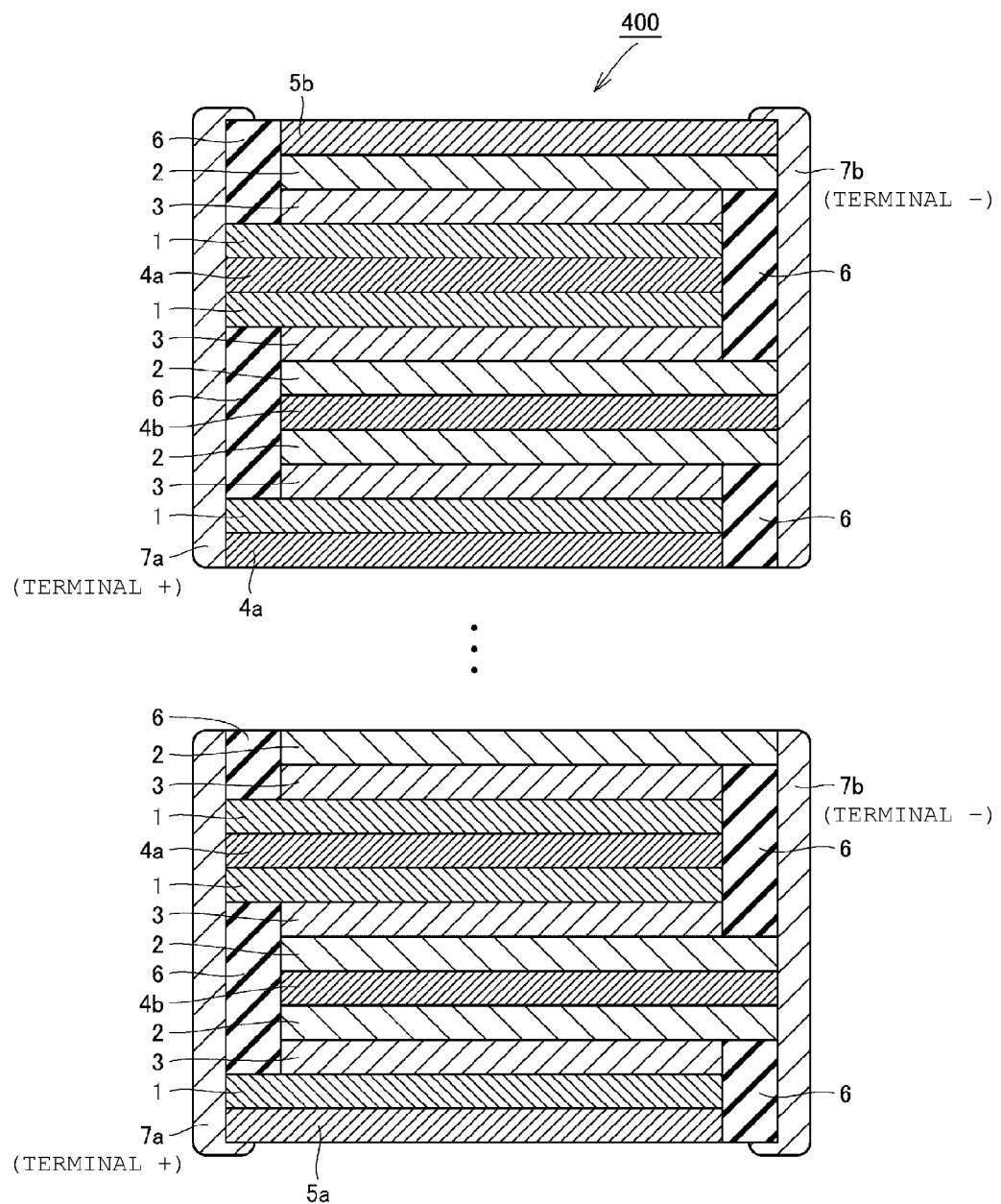
FIG. 7 is a cross-sectional view schematically illustrating a cross-sectional structure of a layered solid-state battery in the case where an odd number of unit cells are provided as a fourth embodiment of the present invention.

Further, as in a layered solid-state battery 400 illustrated in FIG. 7, external collection layers 7a, 7b having electron conductivity may be disposed on the side surface of the layered solid-state battery 300 illustrated in FIG. 6, and the external collection layer 7a may be used as a positive electrode terminal, and the external collection layer 7b may be used as a negative electrode terminal. The material constituting the external collection layers 7a, 7b is not particularly limited and may contain a material having electron conductivity such as a metal material or a carbon material.

In each of the layered solid-state batteries of the first and second embodiments, each constituent element can be realized by using the materials shown below.

The solid electrolyte layer 3 contains the solid electrolyte material as a main material.

The positive electrode layer 1 contains a mixture of the positive electrode active substance material and the solid electrolyte material as a main material. Also, the positive electrode layer 1 may contain a small amount of carbon or the like as an electrically conductive agent.

The negative electrode layer 2 contains a mixture of the negative electrode active substance material and the solid electrolyte material as a main material. Also, the negative electrode layer 2 may contain a small amount of carbon or the like as an electrically conductive agent.

EXAMPLES

Hereafter, Examples of the present invention will be described.

An Example in which a layered solid-state battery according to the second embodiment of the present invention was actually fabricated will be described.

<Synthesis of Active Substance Powder>

Active substance powder including a lithium-containing vanadium phosphoric acid compound $(Li_3V_2(PO_4)_3)$ (hereafter referred to as LVP) as an active substance material and carbon powder as an electrically conductive agent was synthesized by the following procedure.

(1) The powders of $Li_2CO_3$, $V_2O_5$, and $(NH_4)_2H(PO_4)_3$ as raw materials were mixed in a mortar so as to attain a stoichiometric ratio of LVP.

(2) The obtained mixed powder was fired at a temperature of 600° C. for 10 hours in an air atmosphere.

(3) To the obtained fired powder, carbon powder as an electrically conductive material was added and mixed in a mortar.

(4) The obtained mixed powder was fired at a temperature of 950° C. for 10 hours in an argon gas atmosphere.

<Preparation of Sheet for Positive and Negative Electrode Layers, Sheet for Solid Electrolyte Layer, and Sheet for Internal Collection Layer>

Crystal powder of NASICON aluminum-substituted germanium lithium phosphate $(Li_{1.5}Al_{0.5}Ge_{1.5}(PO_4)_3)$ (hereafter referred to as LAGP) as a solid electrolyte material and a binder solution obtained by dissolving polyvinyl alcohol as a binder into toluene were mixed to obtain a slurry for a solid electrolyte layer. The blending ratio was set to be LAGP:polyvinyl alcohol=70:30 in a mass ratio.

Mixed powder obtained by mixing 50 parts by mass of crystal powder of LAGP as a solid electrolyte material, 45 parts by mass of the active substance powder obtained in the above, and 5 parts by mass of carbon powder as an electrically conductive agent in a mortar was used as a main material, and this main material and a binder solution obtained by dissolving polyvinyl alcohol as a binder into toluene were mixed to prepare a slurry for a positive electrode layer and a slurry for a negative electrode layer, which were made of the same material. The blending ratio was set to be main material:polyvinyl alcohol=70:30 as a mass ratio.

Mixed powder obtained by mixing 50 parts by mass of crystal powder of LAGP which was a lithium-germanium-containing NASICON compound as a specific conductive material and 50 parts by mass of carbon powder as an electron-conductive material in a mortar was used as a main material, and this main material and a binder solution obtained by dissolving polyvinyl alcohol as a binder into toluene were mixed to prepare a slurry for an internal collection layer. The blending ratio was set to be main material:polyvinyl alcohol=70:30 as a mass ratio.

The slurry for a positive electrode layer, the slurry for a negative electrode layer, the slurry for a solid electrolyte layer, and the slurry for an internal collection layer prepared in the above-described manner were molded to a thickness of 50 μm by using a doctor blade, thereby to prepare a sheet for a positive electrode layer, a sheet for a negative electrode layer, a sheet for a solid electrolyte layer, and a sheet for an internal collection layer.

<Fabrication of Layered Solid-State Battery>

Figure 4:
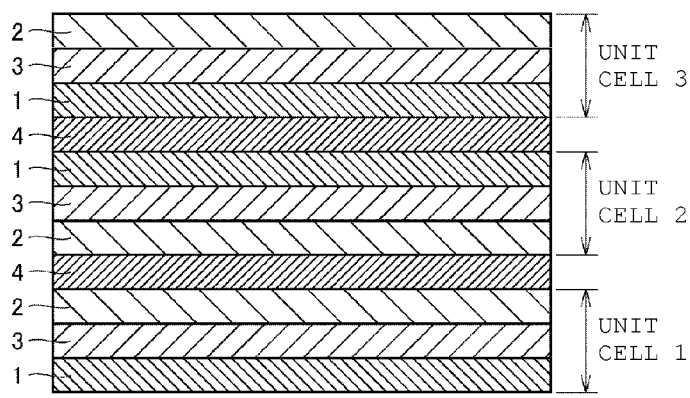
FIG. 4 is a cross-sectional view schematically illustrating a cross-sectional structure of a layered solid-state battery fabricated in the Example of the present invention.

The sheet for the positive electrode layer 1, the sheet for the negative electrode layer 2, the sheet for the solid electrolyte layer 3, and the sheet for the internal collection layer 4 that had been stamped out into a circular disk shape having a diameter of 12 mm were stacked with a construction of a layered body such as illustrated in FIG. 4, and were thermally press-bonded at a temperature of 60° C. under a pressure of 1 ton, thereby to obtain a layered body for the layered solid-state battery 10. Here, the positive electrode layer 1 was constructed by one sheet of the positive electrode layer, and the negative electrode layer 2 was constructed by two sheets of the negative electrode layers.

Figure 5:
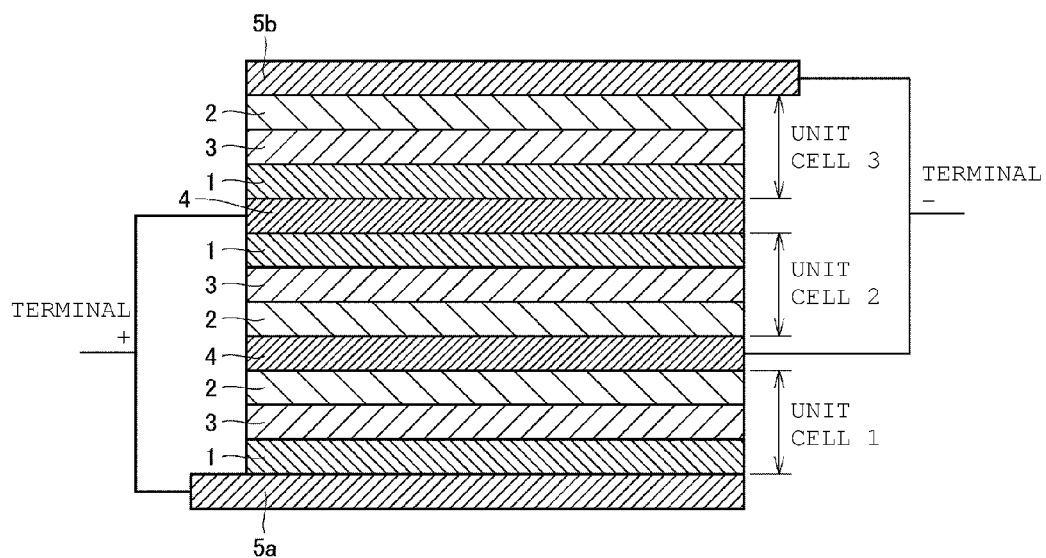
FIG. 5 is a cross-sectional view schematically illustrating a cross-sectional structure of a layered solid-state battery equipped with an external terminal, fabricated in the Example of the present invention.

As the sheets for the external electrodes 5a, 5b illustrated in FIG. 5, the same sheets as those for the internal collection layer 4 were used, and the sheets for the external electrodes 5a, 5b were stacked respectively onto the surfaces of the (unit cell 1) and the (unit cell 3) that are not adjacent to the internal collection layer 4.

The layered body for a solid-state battery obtained in the above-described manner was sandwiched between two sheets of ceramics plates made of alumina, fired at a temperature of 500° C. for 2 hours in an oxygen gas atmosphere to remove polyvinyl alcohol, and thereafter fired at a temperature of 700° C. for 2 hours in a nitrogen gas atmosphere, thereby to perform sinter-bonding of the positive electrode layer 1, the negative electrode layer 2, the solid electrolyte layer 3, the internal collection layer 4, and the external electrodes 5a, 5b.

A withdrawal electrode was formed by wire bonding from the internal collection layer 4 of the fired layered body for a solid-state battery and was bonded to the external electrodes 5a, 5b, thereby to obtain a layered solid-state battery illustrated in FIG. 5.

Further, in order to collect electricity efficiently, a platinum layer was formed by sputtering on the outside of the external electrodes 5a, 5b of the layered solid-state battery illustrated in FIG. 5.

Thereafter, the layered solid-state battery was dried at a temperature of 100° C. and then sealed with a coin cell of 2032 type.

<Evaluation of Solid-State Battery>

As illustrated in FIG. 5, the external electrode 5a was connected to a positive electrode terminal, and the external electrode 5b was connected to a negative electrode terminal, so as to perform charging and discharging. As a result of performing constant-current constant-voltage charging/discharging measurements of the layered solid-state battery illustrated in FIG. 5 in a voltage range of 0 to 3 V and at a current density of 200 µA/cm$^2$, it has been confirmed that charging and discharging can be carried out.

Here, in the present Example, crystal powder of LAGP was used as the solid electrolyte material and the specific conductive material; however, similar effects can be obtained even when non-crystalline powder of LAGP is used.

Also, in the present Example, description has been given only on the case in which LVP is used as a negative electrode active substance; however, similar effects can be obtained even when a graphite-lithium compound, a lithium alloy such as Li—Al, or oxide such as $Li_3V_2(PO_4)_3$, $Li_3Fe_2(PO_4)_3$, or $Li_4Ti_5O_{12}$ is used as the negative electrode active substance.

It is to be considered that the embodiments and Examples disclosed herein are exemplifications in all respects and are not limitative. The scope of the present invention is shown not by the above embodiments but by the claims, and it is intended that all corrections and modifications equivalent to or within the scope of the claims are comprised therein.

According to the layered solid-state battery of the present invention, a monopolar layered solid-state battery in which a plurality of unit cells are connected in parallel with an internal collection layer intervening therebetween can be obtained. Also, the plurality of unit cells constituting the layered solid-state battery can be connected in parallel, and the positive electrode layers or the negative electrode layers can be ion-conductively conducted with each other in adjacent two unit cells, so that the electric potential between the positive electrode layers or the negative electrode layers that are adjacent to each other with the internal collection layer intervening therebetween can be leveled, whereby a layered solid-state battery having a stable output voltage can be obtained.

DESCRIPTION OF REFERENCE SYMBOLS

1: positive electrode layer
2: negative electrode layer
3: solid electrolyte layer
4: internal collection layer
10, 100, 200, 300, 400: layered solid-state battery

The invention claimed is:

1. A layered solid-state battery comprising:
   at least first and second unit cells each of which comprises a positive electrode layer, a solid electrolyte layer, and a negative electrode layer that are sequentially stacked; and
   an internal collection layer disposed in contact with each of the positive electrode layers of the first and second unit cells or in contact with each of the negative electrode layers of the first and second unit cells, so as to intervene between the first and second unit cells,
   wherein the internal collection layer contains an electron conductive material and an ion-conductively electrically conductive specific conductive material,
   wherein the ion-conductively electrically conductive specific conductive material has a structure identical to or similar to that of a solid electrolyte material contained in at least one layer selected from the positive electrode layer and the negative electrode layer, and wherein the solid electrolyte material and the ion-conductively electrically conductive specific conductive material contain a lithium-containing phosphoric acid compound having a NASICON structure.

2. The layered solid-state battery according to claim 1, wherein the electron conductive material contains at least material one selected from the group consisting of an electrically conductive oxide, a metal, and a carbon material.

3. The layered solid-state battery according to claim 1, wherein the lithium-containing phosphoric acid compound having a NASICON structure contained in the ion-conductively electrically conductive specific conductive material is represented by $Li_{1+x}M_xM'_{2-x}(PO_4)_3$, wherein x satisfies 0≤x≤1; M is Al or Ga; and M' is one or more elements selected from the group consisting of Ti, Ge, and Zr.

4. The layered solid-state battery according to claim 1, wherein an active substance material contained in at least one layer selected from the positive electrode layer and the negative electrode layer, a solid electrolyte material contained in at least one layer selected from the positive electrode layer and the negative electrode layer, a solid electrolyte material contained in the solid electrolyte layer, and the ion-conductively electrically conductive specific conductive material contained in the internal collection layer contain a lithium-containing phosphoric acid compound.

5. A layered solid-state battery comprising:
   n pieces of stacked unit cells each of which includes a positive electrode layer, a solid electrolyte layer, and a negative electrode layer that are sequentially stacked;
   n−1 pieces of internal collection layers between the n pieces of the unit cells, each of the n−1 pieces of the internal collection layers being disposed in contact with each of the positive electrode layers of adjacent n-pieces of stacked unit cells or in contact with each of the negative electrode layers of the adjacent n-pieces of stacked unit cells;
   external electrodes having electron conductivity disposed on a surface that is not adjacent to the internal collection layer of a first stage unit cell of the n-pieces of unit cells and on a surface that is not adjacent to the internal collection layer of an n-th stage unit cell of the n-pieces of unit cells;
   a positive electrode terminal connected to the internal collection layers that are in contact with the positive electrode layers of the adjacent unit cells among n−1 pieces of the internal collection layers and the external electrodes that are in contact with the positive electrode layers of the unit cells; and
   a negative electrode terminal connected to the internal collection layers that are in contact with the negative electrode layers of the unit cells among n−1 pieces of the internal collection layers and the external electrodes that are in contact with the negative electrode layers of the unit cells, wherein the internal collection layer contains an electron conductive material and an ion-conductively electrically conductive specific conductive material, n is a whole number that is 2 or greater, the ion-conductively electrically conductive specific conductive material has a structure identical to or similar to that of a solid electrolyte material contained in at least one layer selected from the positive electrode layer and the negative electrode layer, and wherein the solid electrolyte material and the ion-conductively electrically conductive specific conductive material contain a lithium-containing phosphoric acid compound having a NASICON structure.

6. The layered solid-state battery according to claim 5, wherein an electrically conductive material of the external electrode contains at least one material selected from an electrically conductive oxide and a metal.

7. The layered solid-state battery according to claim 5, wherein the electron conductive material contains at least one material one selected from the group consisting of an electrically conductive oxide, a metal, and a carbon material.

8. The layered solid-state battery according to claim 5, wherein the lithium-containing phosphoric acid compound having a NASICON structure contained in the electrically conductive specific conductive material is represented by $Li_{1+x}M_xM'_{2-x}(PO_4)_3$, wherein x satisfies $0 \leq x \leq 1$; M is Al or Ga; and M' is one or more elements selected from the group consisting of Ti, Ge, and Zr.

9. The layered solid-state battery according to claim 5, wherein an active substance material contained in at least one layer selected from the positive electrode layer and the negative electrode layer, a solid electrolyte material contained in at least one layer selected from the positive electrode layer and the negative electrode layer, a solid electrolyte material contained in the solid electrolyte layer, and the ion-conductively electrically conductive specific conductive material contained in the internal collection layer contain a lithium-containing phosphoric acid compound.

\* \* \* \* \*